(12) United States Patent
Bachelder et al.

(10) Patent No.: US 9,234,540 B2
(45) Date of Patent: Jan. 12, 2016

(54) RETAINER—SPRING STEEL SINGLE THREAD ENGAGEMENT

(71) Applicants: Magna International Inc., Aurora (CA); GM GLOBAL TECHNOLOGY OPERATIONS LLC, Detroit, MI (US)

(72) Inventors: Theodore J. Bachelder, Vanderbilt, MI (US); Adam M. Lyon, Mancelona, MI (US); Michael S. Gignilliat, Traverse City, MI (US); Ronald J. Andor, East Jordan, MI (US); Matthew C. Patterson, Warren, MI (US); James R. Roll, Ann Arbor, MI (US)

(73) Assignees: Magna International Inc., Aurora (CA); GM Global Technology Operations LLC, Detroit, MI (US)

(*) Notice: Subject to any disclaimer, the term of this patent is extended or adjusted under 35 U.S.C. 154(b) by 468 days.

(21) Appl. No.: 13/644,063

(22) Filed: Oct. 3, 2012

(65) Prior Publication Data

US 2013/0081255 A1    Apr. 4, 2013

Related U.S. Application Data

(60) Provisional application No. 61/626,830, filed on Oct. 4, 2011.

(51) Int. Cl.
*F16B 39/24* (2006.01)
*B23P 11/00* (2006.01)
*F16B 5/02* (2006.01)
*F16B 37/02* (2006.01)

(52) U.S. Cl.
CPC ............. *F16B 39/24* (2013.01); *B23P 11/00* (2013.01); *F16B 5/02* (2013.01); *F16B 37/02* (2013.01); *Y10T 29/49948* (2015.01)

(58) Field of Classification Search
CPC ............ F16B 39/24; F16B 5/02; F16B 37/02; B23P 11/00; Y10T 29/49948
USPC ..................... 296/193.06, 210, 213
See application file for complete search history.

(56) References Cited

U.S. PATENT DOCUMENTS

| | | |
|---|---|---|
| 5,092,078 A | 3/1992 | Keys |
| 5,651,217 A | 7/1997 | Mesnel |
| 5,651,578 A | 7/1997 | Mistopoulos et al. |
| 6,416,113 B1 * | 7/2002 | Page ........................ 296/146.2 |
| 7,114,221 B2 * | 10/2006 | Gibbons et al. ............... 24/289 |
| 7,837,257 B2 | 11/2010 | Kuntze et al. |

* cited by examiner

*Primary Examiner* — Joseph D Pape
*Assistant Examiner* — Dana Ivey
(74) *Attorney, Agent, or Firm* — Warn Partners, P.C.

(57) ABSTRACT

A retainer for limited space attachment of a vehicle part with a class A surface to a vehicle. The retainer has an attachment base operable for being connected to a rib of the vehicle part. A securing portion including an aperture for receiving a fastener is provided in the retainer. The retainer includes at least one sidewall connected between the attachment base and the securing portion. The sidewall spaces the securing portion from the attachment base to allow for insertion of the fastener and provide predetermined torque tension characteristics.

16 Claims, 5 Drawing Sheets

RETAINER—SPRING STEEL SINGLE THREAD ENGAGEMENT

CROSS-REFERENCE TO RELATED APPLICATIONS

This application claims the benefit of U.S. Provisional Application No. 61/626,830, filed Oct. 4, 2011.

FIELD OF THE INVENTION

The present invention relates to a method for providing a secure connection between a first attachable part such as an appliqué and the pillar or other component part of an automobile.

BACKGROUND OF THE INVENTION

The components of an automobile are connected together in many different ways. One type of connection uses a fastener, such as a bolt or screw.

The packaging space in vehicles is often very limited due to the number of components used to assemble the vehicle, the size of the vehicle, and the like. Some of the area between components, such as a B-pillar and an appliqué, is very limited. This requires some of the fastener designs to be very small. Typically, one type of connector used for retaining two components is a molded "doghouse." A doghouse is a molded-in feature which is used to attach a secondary clip, or the doghouse is used for driving a threaded screw.

Molded-in features, such as a doghouse, often cause a "read" condition on the show surface of a part due to differences in cooling temperatures between the feature and the substrate caused by differences in mass/volume of the resin. A read condition is a deformation or imperfection in a surface. The limited space also causes a tooling condition that is very fragile due to the reduced size. A feature of the type described above has a minimum workable size which does not facilitate the doghouse having suitable strength. The size of the part and the proximity of adjacent features limit the packaging space and travel of movable feature (lifters) in the mold. Certain design requirements also include a threaded primary fastener which dictates a secondary fastener of the type that accepts a screw. Current designs include a molded "boss" which is threadable, but tends to cause a read condition as discussed above, and also tends to break, increasing scrap during manufacturing.

Other designs have been created in an attempt to solve the aforementioned problems. One such design is insert molding of the threaded fasteners. Another design has incorporated the use of a "U-nut" or "J-nut," which are spring steel nuts that require a molded feature. A third attempted design is a molded in boss which is threadable by means of a self-tapping primary fastener. However, none of these designs overcome the aforementioned problems.

Accordingly, there exists a need for a retainer which provides a suitable connection between an appliqué and a pillar, such as an A-pillar, B-pillar, or C-pillar of an automobile.

SUMMARY OF THE INVENTION

The present invention is directed to a method of attachment between two components. More specifically, the present invention is a retainer used for providing a connection between the B-pillar of an automobile, and an appliqué having a high-gloss surface, or "show surface." In one embodiment, the present invention includes a hat-shaped spring steel employing a single thread engagement feature to engage a secondary fastener.

The present invention simplifies mold design, minimizes potential for a read condition, and provides a robust engagement for a threaded primary fastener in limited space. The present invention also provides design flexibility in term of secondary fastener orientation relative to adjacent features in the mold by means of simplified lifters, and provides a method of prevailing torque.

It is an object of the invention to provide for attachment of the exterior ornamentation of an appliqué in a limited packaging space that is robust without introducing a read condition or breakage. It is another object of the invention to minimize the risk associated with weak (small) tooling condition. It is another object of the invention to simplify the molding by minimizing lifter travel and lifter angle. It is yet another object of the invention to provide a prevailing torque on the primary fastener.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
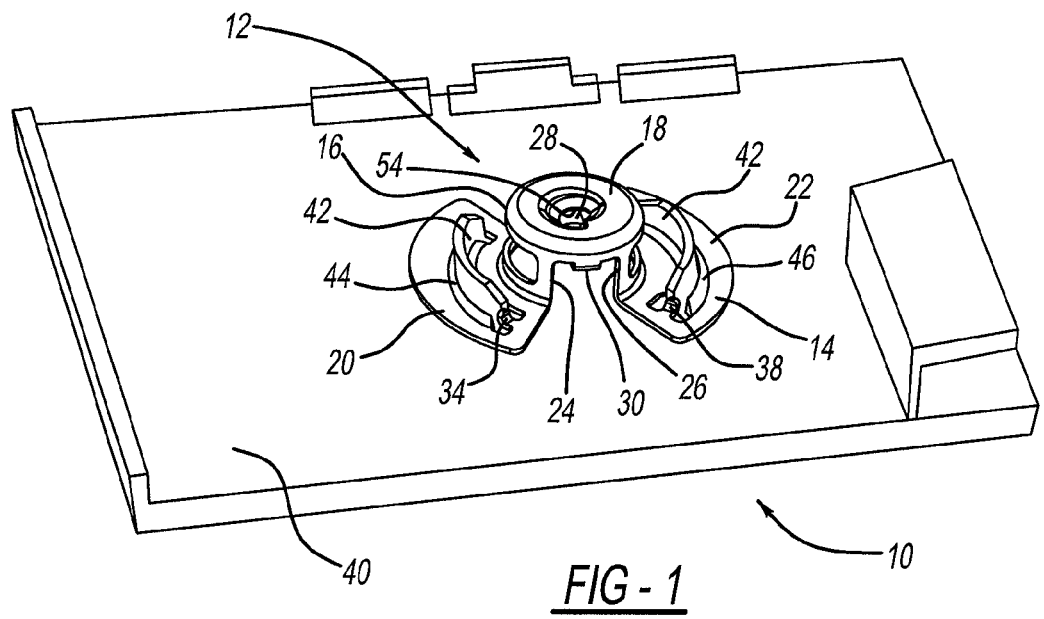
FIG. 1 is a perspective view of a retainer attached to a door appliqué, according to the present invention.

The following description of the preferred embodiment(s) is merely exemplary in nature and is in no way intended to limit the invention, its application, or uses.

An embodiment of a part incorporating a method for attachment is shown in FIGS. 1-3 and 5 generally at 10. The part 10 includes a retainer, shown generally at 12, having an attachment base 14 connected to a sidewall 16. The sidewall 16 is connected to a securing portion 18. More specifically, the attachment base 14 includes a first attachment surface 20 and a second attachment surface 22. The first attachment surface 20 is connected to a first sidewall 24, and the second attachment surface 22 is connected to a second sidewall 26.

Both sidewalls 24,26 are connected to the securing portion 18, and the securing portion 18 has an aperture 28 which is operable for receiving a fastener, such as a screw 52. The attachment base 14 and securing portion 18 are spaced from one another to allow clearance for a screw or other fastener to enter the area beneath the securing portion 18. The aperture 28 has a single thread engagement feature 54. In this embodiment, the securing portion 18 is circular in shape, and the sidewalls 24,26 are curved to correspond to the shape of the securing portion 18. Also formed as part of the securing portion 18 are two torque features 30. It is within the scope of the invention that the securing portion 18, the sidewalls 24,26, and attachment base 14 may be formed separately. In this embodiment, the sidewalls 24,26, the securing portion 18, and the attachment base 14 are integrally formed together of a stamped steel which is austempered into spring steel. As an example, the steel is preferably 0.017 inches thick, and corrosion treated. The configuration of the sidewalls 24,26 and the spring steel type and thickness are selected based on the torque tension specifications required in the particular application.

The first attachment surface 20 includes a first aperture 32 which has a first plurality of flanges 34, and the second attachment surface 22 has a second aperture 36 which has a second plurality of flanges 38. Each of the flanges 34,38 are deflectable, the function of which will be described later.

The retainer 12 is connected to a first attachable part, such as a panel for assembly to a vehicle. In this embodiment, the panel is an appliqué 40 for a second attachable part, such as a B-pillar 50. Integrally formed as part of the appliqué 40 are retaining ribs 42. Each retaining rib 42 is arcuate in shape, to match the corresponding arcuate shape of the apertures 32,36. The first aperture 32 also includes a first plurality of gripping flanges 44 which grip one of the retaining ribs 42, and the second aperture 36 also includes a second plurality of gripping flanges 46 which grip another of the retaining ribs 42.

During assembly, the retainer 12 is moved towards the appliqué 40 such that each rib 42 is in alignment with a corresponding aperture 32,36. Pressure is applied to the retainer 12 to force the ribs 42 into one of the apertures 32,36. Proper alignment is provided by the flanges 34,38, which deflect as the ribs 42 are forced into the apertures 32,36. The gripping flanges 44,46 also deflect as the ribs 42 are forced into the apertures 32,36, but the gripping flanges 44,46 also have serrated portions 48 which extend into the ribs 42, and prevent the ribs 42 from being pulled out of the apertures 32,36, securing the connection between the retainer 12 and the appliqué 40.

Once the retainer 12 has been attached to the appliqué 40, the part 10 may be attached to a B-pillar 50 of a vehicle. This may be achieved through the use of a fastener, which in this embodiment is a threaded screw 52, which is inserted into the aperture 28 and engages the single thread engagement feature 54. As the screw 52 is inserted into the aperture 28, pressure is applied to the screw 52 from the torque features 30, which prevents the screw 52 from being removed from the aperture 28. This secures the retainer 12, and therefore, the door appliqué 40, to the B-pillar 50.

The retainer 12 of the present invention is typically designed to provide predetermined torque tension requirements in the installed application. The use of the arcuate rib engaged by and arcuate securement slot in the gripping flange allows for higher torque resistance, since the entire rib withstands the rotary shearing torque of during insertion of a fastener. This makes the present invention much more robust than previous designs. The torque to fail values can be adjusted to the application requirements. The value will be based on the radius, or centerline diameter of the arcuate ribs. The larger the diameter of the arcuate rib higher torque values. The fasteners 52 require tension to ensure they resist backing out due to vibration.

Also, the part must be adequately secured to the B-pillar 50 of the vehicle or the like. The sidewalls 24,26 of the retainer 12 are used to meet the required torque tension requirements.

Figure 4:
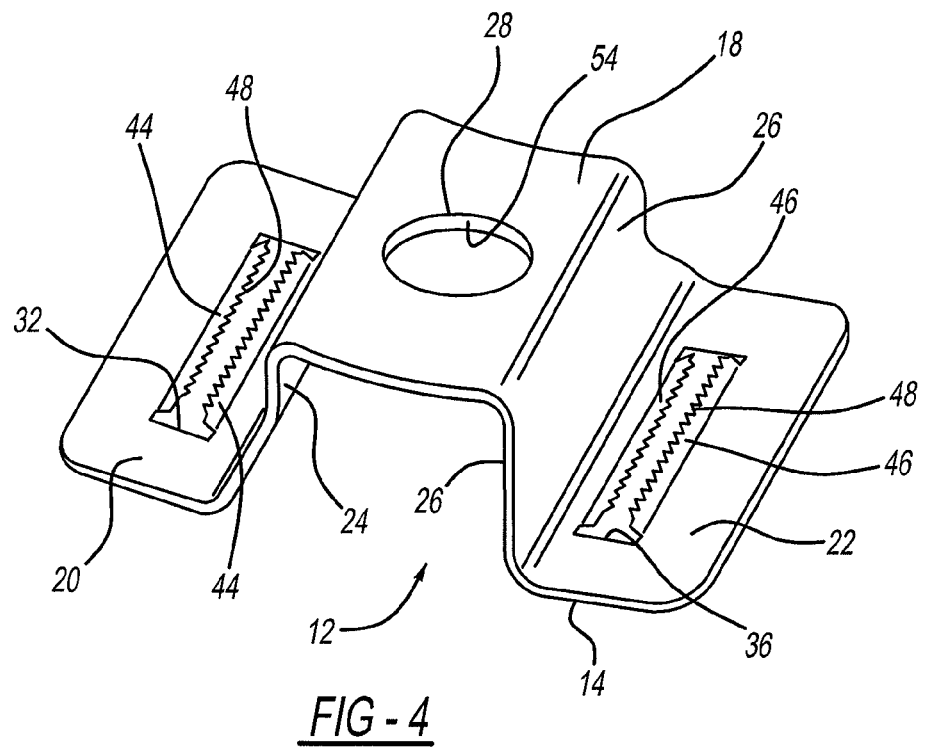
FIG. 4 is a perspective view of a first alternate embodiment of a retainer, according to the present invention.
Figure 5:
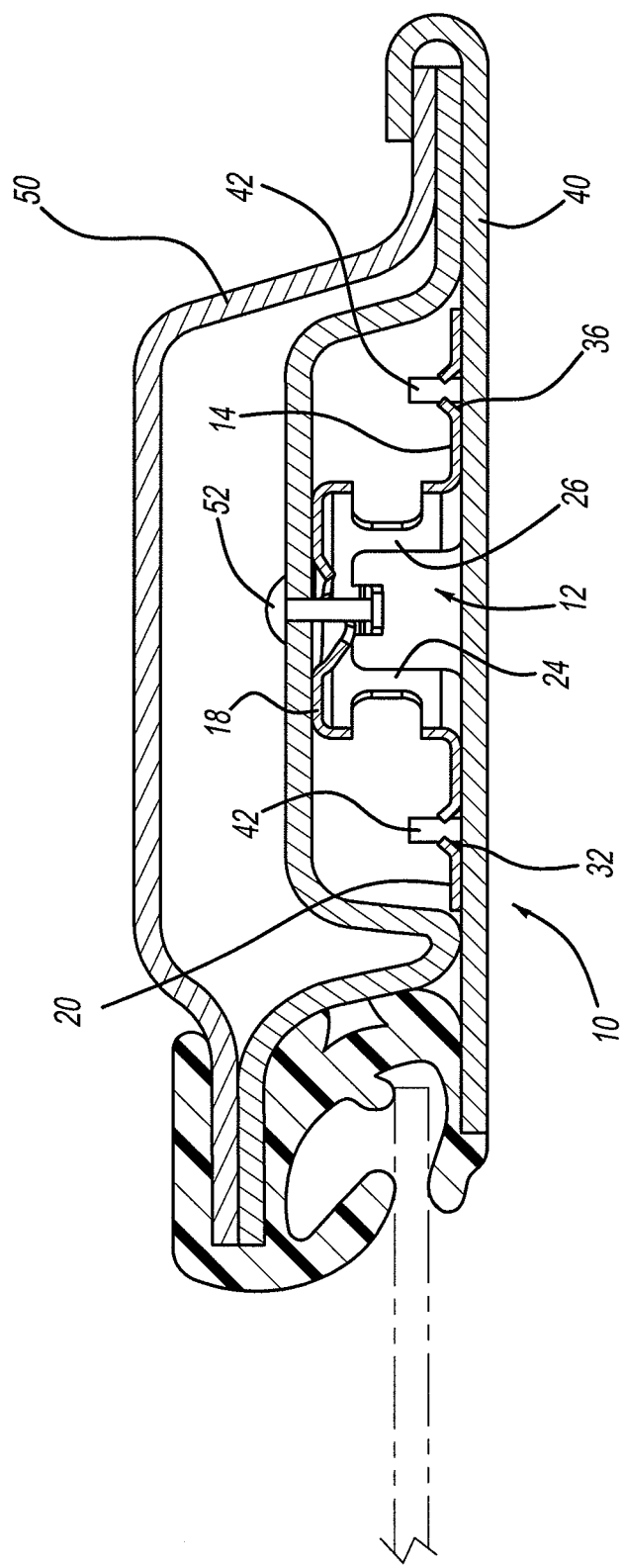
FIG. 5 is a sectional top view of a door appliqué connected to a B-pillar of an automobile using a retainer, according to the present invention.

An alternate embodiment of the present invention is shown in FIG. 4, with like numbers referring to like elements. In this embodiment, the sidewalls 24,26 are not curved, but "hat-shape," providing for the retainer 12 to have a hat-shaped cross section. While the securement apertures 32 and 36 are straight it is to be appreciated for the highest torque resistance the slots may be arcuately formed.

Figure 6:
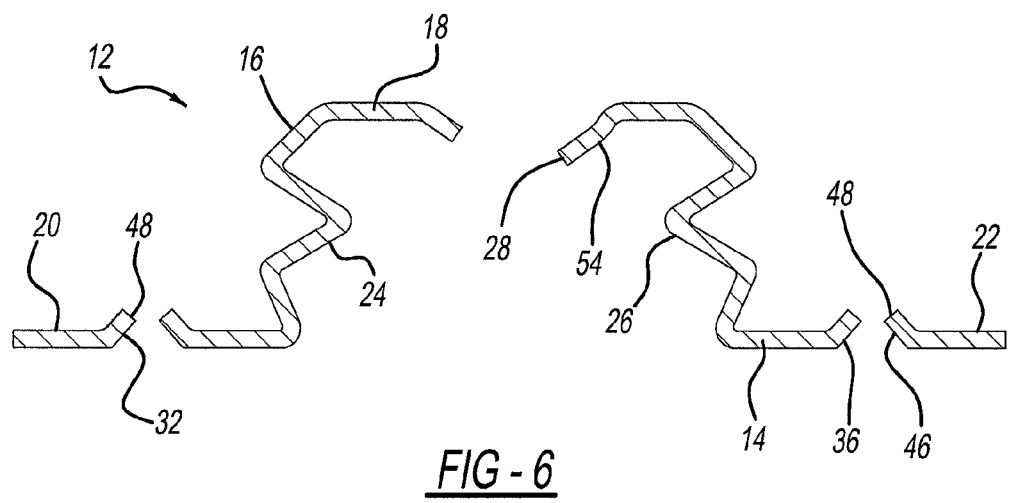
FIG. 6 is a sectional view of a second alternate embodiment of a retainer, according to the present invention.

Another embodiment of the present invention is shown in FIG. 6, where like numbers refer to like elements. In this embodiment, the sidewalls 24,26 have a spring-type of cross-section, which allows for the sidewalls 24,26 to deflect, and better compensate for variances in the shape of the B-pillar 50 and the door appliqué 40.

Figure 2:
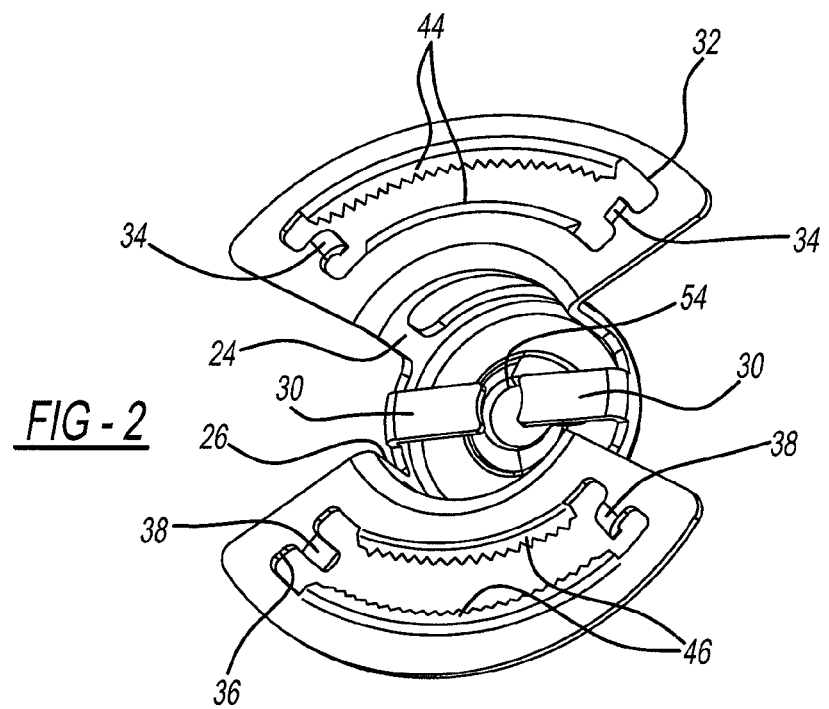
FIG. 2 is a perspective bottom view of a retainer, according to the present invention.
Figure 3:
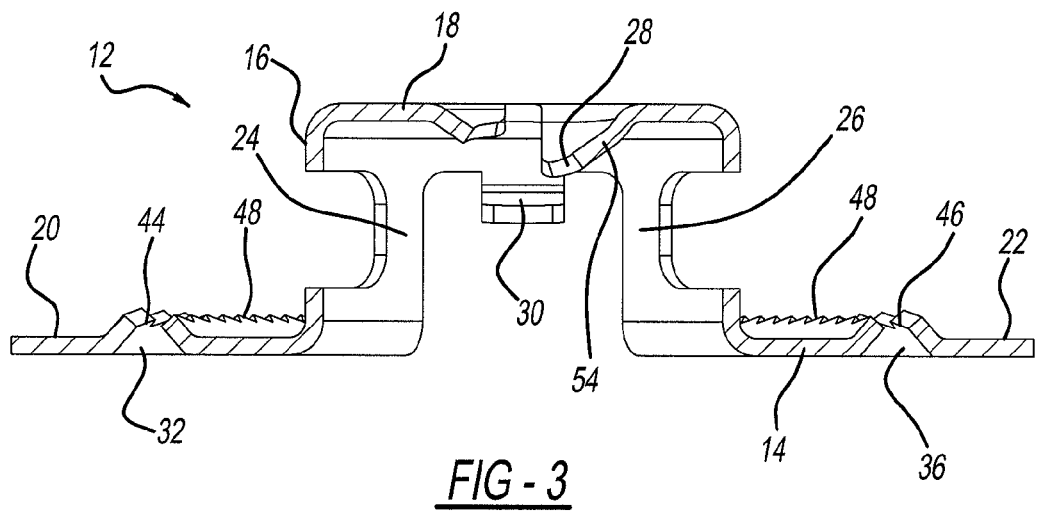
FIG. 3 is a sectional view of a retainer, according to the present invention.
Figure 7:
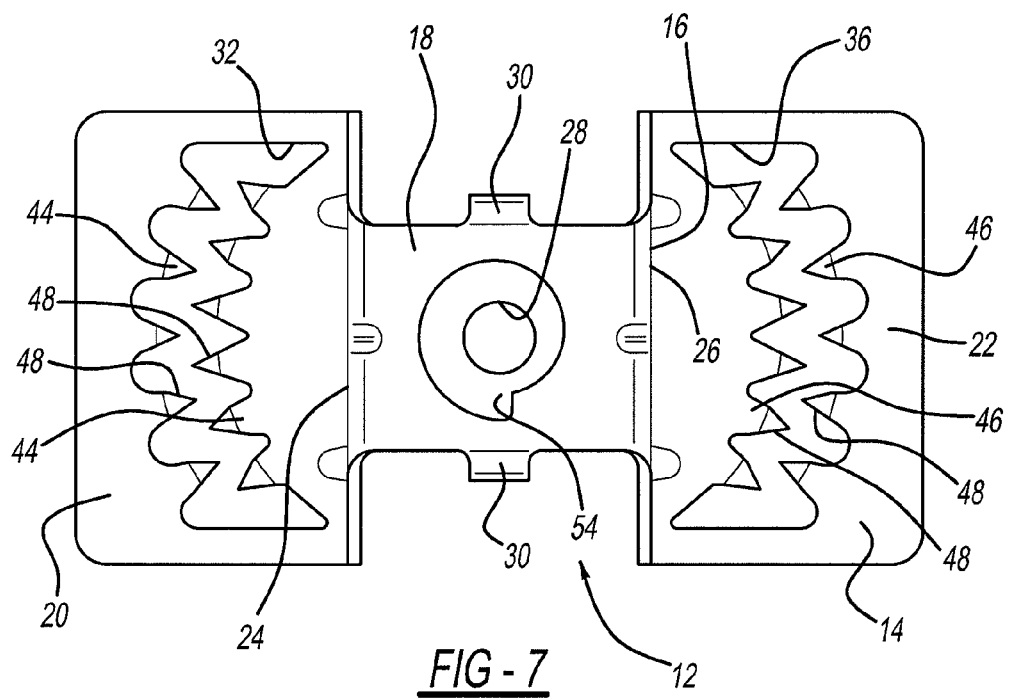
FIG. 7 is a top view of a third alternate embodiment of a retainer, according to the present invention.
Figure 8:
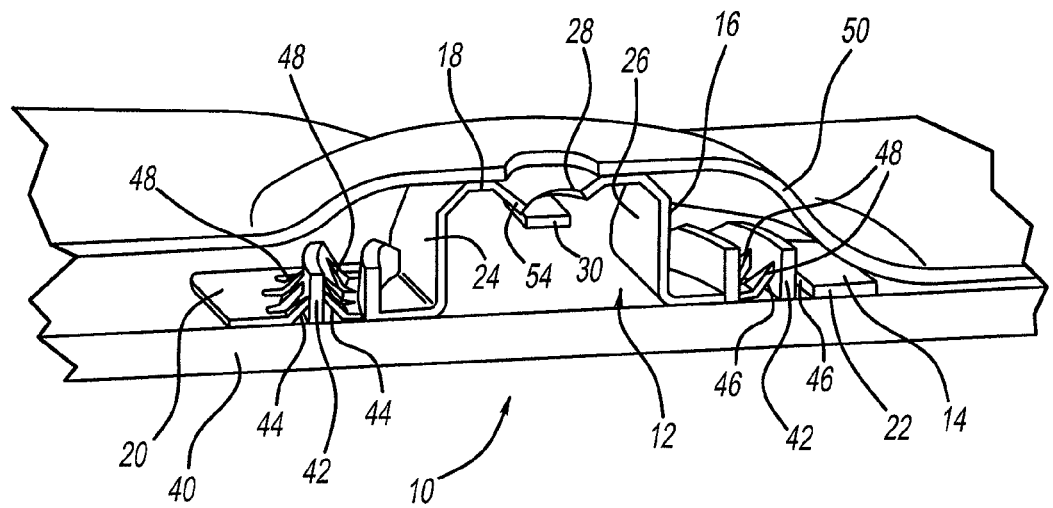
FIG. 8 is a sectional view of a third alternate embodiment of a retainer, according to the present invention.
Figure 9:
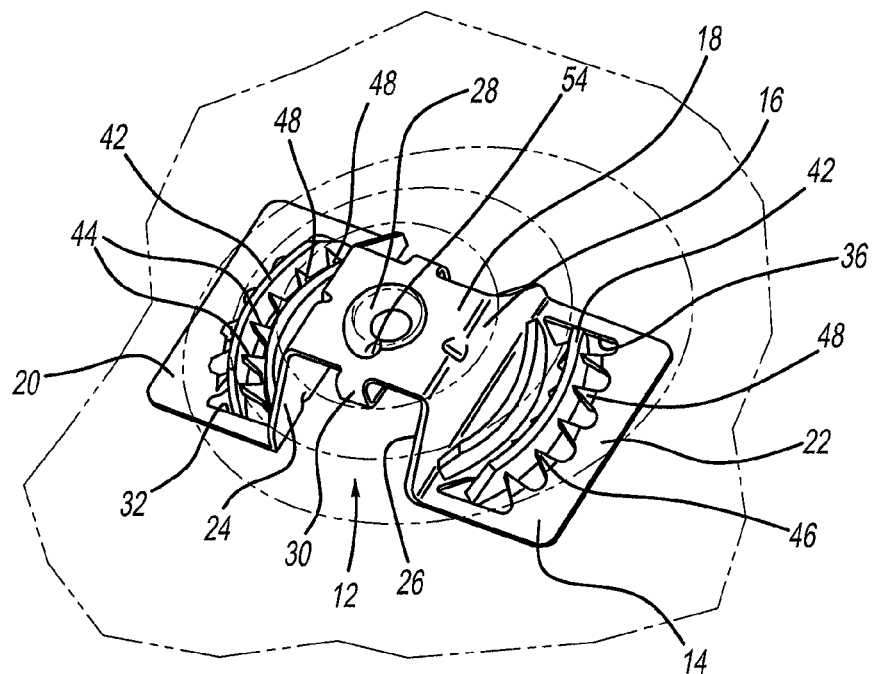
FIG. 9 is a perspective view of a third alternate embodiment of a retainer, according to the present invention.

Another embodiment of the present invention is shown in FIGS. 7-9, with like numbers referring to like elements. This embodiment of the retainer 12 combines various features of the previous embodiments. The sidewalls 24,26 have the "hat shape" similar to the embodiment shown in FIG. 4, but the apertures 32,36 are curved in a similar manner as shown in FIGS. 1-3.

One of the advantages of the present invention is that the ribs 42 that are integrally formed with the appliqué 40 use a minimal amount of material. This greatly reduces or eliminates the amount of read condition on the outer surface of the appliqué 40, where it is necessary to have a high-gloss, esthetically pleasing appearance.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A retainer, comprising:
    an attachment base operable for being connected to a rib;
    a securing portion including an aperture for receiving a fastener; and
    at least one sidewall connected between said attachment base and said securing portion, said at least one sidewall spaces said securing portion from said attachment base to allow for insertion of said fastener and predetermined torque tension characteristics;
    said attachment base further comprising:
    a first attachment surface;
    a first aperture that is part of said first attachment surface;
    a first plurality of flanges that is part of said first attachment surface in proximity to said first aperture; and
    a first plurality of gripping flanges that is part of said first attachment surface in proximity to said first aperture, said first plurality of gripping flanges operable for gripping said rib.

2. The retainer of claim 1, further comprising a door appliqué, said rib further comprising a plurality of ribs, a first of said plurality of ribs extending through said first aperture that is part of said first attachment surface such that said first plurality of flanges provide proper alignment of said first of said plurality of ribs relative to said retainer, and said first plurality of gripping flanges prevent said first of said plurality of ribs from being removed from said first aperture that is part of said first attachment surface.

3. The retainer of claim 2, further comprising:
a second attachment surface;
a second aperture that is part of said second attachment surface;
a second plurality of flanges that is part of said second attachment surface in proximity to said second aperture; and
a second plurality of gripping flanges that is part of said second attachment surface in proximity to said second aperture, said second plurality of gripping flanges operable for attachment to one of said plurality of ribs.

4. The retainer of claim 3, a second of said plurality of ribs extending through said second aperture that is part of said second attachment surface such that said second plurality of flanges provide proper alignment of said second of said plurality of ribs relative to said retainer, and said second plurality of gripping flanges prevent said second of said plurality of ribs from being removed from said second aperture that is part of said second attachment surface.

5. The retainer of claim 1, said first aperture that is part of said first attachment surface being curved in shape, and a second aperture that is part of a second attachment surface being curved in shape.

6. The retainer of claim 5, wherein said first sidewall is curved in shape, and said second sidewall is curved in shape.

7. The retainer of claim 1, said at least one sidewall further comprising:
a first sidewall connected to said securing portion;
a second sidewall connected to said securing portion; and
wherein said first sidewall and said second sidewall support said securing portion to provide said predetermined torque tension characteristics.

8. The retainer of claim 1, further comprising at least one torque feature that is part of said securing portion, such that when said fastener extends through said aperture that is part of said securing portion, said torque feature applies pressure to said fastener, preventing said fastener from being removed from said aperture that is part of said securing portion.

9. The retainer of claim 1, further comprising a B-pillar, said securing portion connected to said B-pillar through the use of said fastener.

10. The retainer of claim 1, further comprising:
a single thread engagement feature that is part of said aperture that is part of said securing portion; and
wherein said fastener is a screw engaged with said single thread engagement feature when said screw is inserted through said aperture that is part of said securing portion.

11. A vehicle part including an at attachment fixture comprising:
at least one arcuate rib portion extending from said vehicle part;
a retainer portion, comprising: a securing portion including a securement aperture for receiving a fastener;
an attachment base operable for being connected to a rib said attachment base including an arcuate attachment aperture, said aperture including a plurality of gripping flanges extending into said aperture, said arcuate rib extending through said aperture for securing said retainer portion to said vehicle part said arcuate rib and said arcuate aperture attachment withstands torque tension characteristics because the arcuate shape of the rib withstands a rotary shearing force over the entire length of the rib; and
at least one sidewall connected between said attachment base and said securing portion, said at least one sidewall spacing said securing portion from said attachment base to allow for insertion of said fastener and provide predetermined torque tension characteristics.

12. The vehicle part according to claim 11, wherein said vehicle part further comprises at least two arcuate ribs and said attachment base including at least two corresponding attachment apertures.

13. The vehicle part according to claim 12, wherein said arcuate aperture further include centering ramp portions on either end of the aperture for providing centering of the aperture on the arcuate rib.

14. The vehicle part according to claim 11, wherein the attachment feature is made of a spring steel material.

15. The vehicle part according to claim 11, wherein the vehicle part is made from an injection moldable polymer.

16. The vehicle part of claim 11, wherein the retainer portion and arcuate rib is designed to meet a predetermined torque to fail value based on the selection of the radius of the rib to meet said predetermined torque to fail value.

* * * * *